(12) United States Patent
Blangetti et al.

(10) Patent No.: US 6,375,718 B1
(45) Date of Patent: Apr. 23, 2002

(54) APPARATUS AND PROCESS FOR GAS/LIQUID SEPARATION

(75) Inventors: Francisco Blangetti, Baden; Stephan Werner Doehler, Berikon, both of (CH); Erhard Liebig, Laufenburg; Rainer Schlageter, Grafenau, both of (DE)

(73) Assignee: Alstom (Switzerland) Ltd, Baden (CH)

( * ) Notice: Subject to any disclaimer, the term of this patent is extended or adjusted under 35 U.S.C. 154(b) by 27 days.

(21) Appl. No.: 09/598,709

(22) Filed: Jun. 21, 2000

(30) Foreign Application Priority Data

Jun. 25, 1999 (EP) .............................. 99810558

(51) Int. Cl.$^7$ .............................................. B01D 19/00
(52) U.S. Cl. ............................ 95/244; 95/247; 95/262; 95/266; 96/157; 96/197; 96/201; 96/203
(58) Field of Search .......................... 95/241, 244, 247, 95/262, 266; 96/202, 203, 155, 157, 158, 168, 193, 197, 201, 220

(56) References Cited

U.S. PATENT DOCUMENTS

| | | | | |
|---|---|---|---|---|
| 1,255,395 | A | * | 2/1918 | Duram |
| 1,560,754 | A | * | 11/1925 | Broido |
| 1,790,911 | A | * | 2/1931 | Gibson |
| 2,246,691 | A | * | 6/1941 | Nobis |
| 2,815,765 | A | * | 12/1957 | Adelson |
| 2,954,840 | A | * | 10/1960 | Freneau |
| 3,344,587 | A | * | 10/1967 | Wakeman |
| 3,460,319 | A | * | 8/1969 | Tkach |
| 3,710,549 | A | * | 1/1973 | Nichols et al. |
| 4,002,440 | A | * | 1/1977 | Saari |
| 4,268,280 | A | * | 5/1981 | Fujii et al. |
| 4,373,379 | A | | 2/1983 | Obara et al. |
| 4,385,908 | A | * | 5/1983 | Carmichael |
| 4,718,922 | A | * | 1/1988 | Roffelsen |
| 4,997,464 | A | * | 3/1991 | Kopf |
| 5,050,540 | A | * | 9/1991 | Lindberg |
| 5,139,082 | A | | 8/1992 | McEachern, Jr. |
| 5,255,505 | A | | 10/1993 | Cloyd et al. |
| 5,308,384 | A | * | 5/1994 | Kapanen et al. |
| 5,343,705 | A | * | 9/1994 | Athey et al. |

FOREIGN PATENT DOCUMENTS

| | | |
|---|---|---|
| EP | 0 918 151 | 5/1999 |
| JP | 57125337 | 8/1982 |
| WO | WO97/03281 | 1/1997 |

OTHER PUBLICATIONS

W.J. Beek and K.M.K. Muttzall: Transport Phenomena, pp 101/106, Wiley and Sons (1975).

W. Bohl: Technische Strömungslehre (Technical Fluid Dynamics), pp. 230–232, Vogel–Handbuch (1982).

* cited by examiner

*Primary Examiner*—Duane S. Smith
(74) *Attorney, Agent, or Firm*—Burns, Doane, Swecker & Mathis, L.L.P.

(57) ABSTRACT

Connected in a water circuit for cooling or heating gaseous fuel in a fuel system for a gas turbine plant is a gas/liquid separation apparatus which serves to separate gases contained in the water from the water, and to detect them. The container of the separation apparatus is split up by a partition into a water entry chamber and a water exit chamber. The incoming water flow is split up in the water entry chamber into an upward-flowing and a downward-flowing water flow. Located above the water is a gas-filled space into which gas bubbles disperse. The upward-flowing water flows over an overflow weir, and the downward-flowing water flows into the water exit chamber through openings in the lower region of the partition. The separation apparatus thus includes a calm, free water level in the water entry chamber, and an irrotational flow from the water exit chamber.

17 Claims, 4 Drawing Sheets

APPARATUS AND PROCESS FOR GAS/LIQUID SEPARATION

This application claims priority under 35 U.S.C. §§119 and/or 365 to Application Ser. No. 99 810 558.9 filed in Europe on Jun. 25. 1999; the entire content of which is hereby incorporated by reference.

FIELD OF THE INVENTION

The invention relates to a fuel system for a gas turbine plant, which has a heat exchanger for cooling and/or a heat exchanger for heating gaseous fuel, the cooling or heating medium being water which flows in a water circuit. The invention relates, in particular, to a gas/liquid separation apparatus in this water circuit, and to a process for separating gas from such water. The separation apparatus serves to separate gas from the water and to detect the gases separated from the water, and thus to increase the operational reliability of the system. Denoted below as fuel is a gaseous fuel such as, for example, $CH_4$, $C_2H_6$, $CO$, $H_2$ or a gas mixture.

BACKGROUND OF THE INVENTION

Gaseous fuel which is intended for a gas turbine plant is generally led, coming from a natural gas feed line, firstly through a fuel system in which the parameters, required for the further combustion of the fuel, are controlled.

For example, temporal pressure fluctuations of the fuel occur in the natural gas feed line. In order to equalize these fluctuations, the pressure in the fuel system is appropriately raised or reduced. After a pressure reduction, the fuel can have, for example, a temperature which could cause icing of valves or damage to other subassemblies of the plant. In order to prevent this, the fuel is, for example, already heated before the pressure reduction in a heat exchanger, a so-called dew-point heater. Hot water, for example, is used as heating medium for such dew-point heaters. Furthermore, such a fuel system can be used to enhance or optimize the efficiency of the gas turbine plant. The fuel is preheated for this purpose in a heat exchanger to a prescribed temperature.

A system for heating the fuel in order to enhance or optimize the efficiency of the gas turbine plant is disclosed, for example, in EP 0 918 151, which is hereby incorporated by reference. There, the fuel is guided through the tubes of a heat exchanger around which water flows as a heating medium which flows in a water circuit and has been preheated in a waste-heat recuperator of a gas turbine plant. In particular, the pressure of the fuel is higher than that of the water, in this case.

In particular, the pressure of the fuel is higher than that of the water, in this case.

In order to control a gas compressor for example in a load range below 80%, the fraction of the mass flow not going to the gas turbine plant is recirculated and thereby fed once again to the compressor inlet. Connected in the recirculation line is a heat exchanger in which the fuel is cooled by means of water. Heating of the compressor is thereby avoided in the recirculation operation.

The fuel is led for this purpose through the tubes of the heat exchanger, about which cooling water flows. The cooling water is pumped by means of a delivery pump through a cooling-water circuit which essentially comprises the delivery pump, the heat exchanger, a water-to-water cooler and a gas/liquid separation apparatus. The pressure of the fuel is significantly higher than that of the cooling water in the heat exchanger for cooling the fuel.

Since in both above described heat exchangers, for cooling and for heating the fuel by means of water, the pressure of the fuel is higher than that of the water, there is the risk of a leak occurring, in which case fuel passes into the water. This results in a two-phase flow in the water circuit, which constitutes a safety risk for operating the plant. For example, there is the risk of ignition or explosion in the case of mixing with air at the suction connection of the delivery pump. Furthermore, running dry or cavitation of the delivery pump can occur. Consequently, it .is very important to detect gas leaks at an early stage in order to avoid sizable damage in the system.

In order to limit the level of risk, a gas/liquid separation apparatus, called a separation apparatus here, for short, is connected in the water circuit downstream of the heat exchanger. It serves to separate gases contained in the water, and to detect the gases separated from the water. These are principally methane, hydrogen and further combustible gases. For this purpose, the gases are fed via a gas extraction line to a gas detector, for example a mass spectrometer. In the case of a measurable gas concentration, an appropriate warning is then released, so that necessary countermeasures can be undertaken.

Conventional separation apparatuses which are currently being used have no defined water level as a free surface in the separation apparatus itself, at which the gas bubbles entrained in the water can escape and pass into a gas extraction line. Consequently, the separation and detection of the gases is not sufficiently ensured, with the result that it is not possible to detect a leak reliably in good time.

SUMMARY OF THE INVENTION

In view of the above-named prior art, it is the object of the invention to create a gas/liquid separation apparatus for a water circuit of a fuel system for a gas turbine plant, and a process for separating gas from the water, by means of which the separation of gaseous fuel from the water is improved so that the reliability of the gas detection is raised and, consequently, the level of risk for the operation of the water circuit of a fuel system is reduced.

This object is achieved in accordance with the invention by means of a gas/liquid separation apparatus in a water circuit of a fuel system for a gas turbine plant which has a container with a water inlet and water outlet, and a gas extraction line which leads to a gas detector. According to the invention, the separation apparatus is partitioned by a separating wall in the interior of its container into a water entry chamber and a water exit chamber which are hydraulically interconnected at least in the upper region of the container, thus producing in the water entry chamber a columetric flow flowing upward from the water inlet. This columetric flow then flows from the water entry chamber into the water exit chamber and from there into the water outlet. Furthermore, particularly in the region of it upper termination, the container has a line for feeding into the container a gas which fills a space above the water, as a result of which the water in the container has a free surface.

The partitioning of the container volume into a water entry chamber and a water exit chamber is intended to form a calming section in the water entry chamber at which gas can be separated from the water, and a water outlet in the water exit chamber, which is separated from the calming section. In this case, the free surface is defined by the pressure in the gas-filled space. The hydraulic connection in the upper region of the two water chambers produces in the water entry chamber an upwardly flowing volumetric flow with the aid of which gas bubbles disperse in water rise. The calming section also effects an upwardly directed, non-turbulent flow with a homogeneous velocity profile. This is achieved in conjunction with a suitable duct guidance and low Reynolds numbers, re <700 for water, for example. The gas bubbles can escape at the free and calm surface of the calming section without disturbance from the water into the gas-filled space situated thereabove. In the process, the gas fed into this space differs from the gases from the water. The water exit chamber, which is separate from the water entry chamber, permits an irrotational water outlet, as a result of which as few gas bubbles as possible are entrained into the water outlet.

In a preferred embodiment, the two water chambers are hydraulically connected in their upper region as follows.

The partition which separates the two chambers from one another is tightly connected to the base of the container. There is a free space between the upper edge of the partition and the upper termination of the container. The water flowing upward in the water entry chamber flows over the edge of the partition in the manner of an overflow weir into the water exit chamber. Because of the large width of the overflow weir, slight cross flows prevail in the calming section, with the result that a small number of gas bubbles are entrained by such flows into the water exit chamber. The majority of the gas bubbles which have risen escape instead of this without disturbance into the gas-filled space.

In a variant, the hydraulic connection between the two water chambers comprises one or more openings in the upper region of the partition.

In an advantageous embodiment of the invention, the partition of the gas/liquid separation apparatus has in the region of the base of the container a plurality of openings through which water can flow from the water entry chamber into the water exit chamber. These openings split up the water flow in the water entry chamber into a smaller downwardly flowing volumetric flow and a larger upwardly flowing volumetric flow. The openings ensure an additional hydraulic connection between the two water chambers, and permit the control of the division of flow and of the water level in the water entry chamber.

The additional hydraulic connection between the two water chambers also ensures hydrostatic pressure equalization even in the case of standstill.

In a further design, the separation apparatus has a pressure control valve in the line for feeding the gas into the container, and a level-measuring unit in the water exit chamber. These serve the purpose of controlling the water level in the water exit chamber by virtue of the fact that the gas pressure in the gas-filled space is controlled in accordance with a desired value for the water level, the water level in the water exit chamber being kept at a level below the upper edge of the partition.

For the case of a sudden relatively large gas leak, for example in the case of tube fractures, the container has at its upper termination a safety valve via which gas can escape into the outside, with the result that the container pressure remains within a permissible region.

In a preferred design of the separation apparatus, the partition is angled in a V shape in its horizontal cross section between the two chambers. The smaller, inner angle of the V-shaped partition faces the water exit chamber, the inner side of the V-shaped partition forming the water exit chamber together with the container inner wall. The larger, outer angle of the V-shaped partition faces the water entry chamber, the outer side of the V-shaped partition surrounding the water entry chamber together with the container inner wall. Given appropriate installation, the water entry chamber therefore has a larger volume than the water exit chamber. Furthermore, the V shape of the partition lends an increased stiffness, with the result that the flow loadings such as, for example, buffeting or so-called "water hammering" can be more effectively resisted. In addition, the V shape of the partition permits an enlargement of the overflow width of the overflow weir for a given container cross section.

In a variant of this design, the partition has a zig zag weir line, as a result of which the overflow width of the weir is additionally enlarged.

In a further design, the partition is shaped in the form of a cylinder envelope.

In a preferred design, the water exit chamber is shaped so as to achieve an irrotational flow in the direction of the water outlet tube. In one design, the water exit chamber has built-in components for calming the outlet. In a further design, the outlet is implemented by a single-limbed or two-limbed U tube, one limb of the U tube projecting into the water exit chamber, and the other being located outside the container.

The container also has in the region of the container base a drainage nozzle for the purpose of emptying at standstill.

In a process in accordance with the invention, for the purpose of separating gas from the water of a water circuit in the fuel system described at the beginning the water is firstly led into a container where it flows upward at a uniform speed in a water entrance chamber and entrains gas bubbles in so doing. At the free surface of a calming section, in the water entry chamber the gas bubbles escape from the water into a gas-filled space above the water surface, the free surface being defined by the gas pressure in this space. The water flows via a hydraulic connection into a water exit chamber, which is separated from the water entry chamber by a partition, and flows irrotationally in the water exit chamber into a water outlet.

An undisturbed rise of the gas bubbles in the water entry chamber toward the water surface is effected by as large as possible a volume of the water entry chamber and the rate of rise of the water which is thereby as low as possible. The gas bubbles escape into the gas-filled space at the water surface of the calming section. The cross flows in the calming section are reduced by means of as wide as possible an overflow weir, as a result of which the surface is as calm as possible, and the gas bubbles can more effectively escape from the water. This prevents gas bubbles from being entrained into the water exit chamber and not being detected.

The height of the water level of the weir in the water entry chamber is a function of the incoming volumetric flow of the water and of the overflow width of the overflow weir. The level in the water exit chamber is controlled by the pressure of the gas in the gas-filled space, the water level in the water exit chamber being kept below the upper edge of the partition. For this purpose, a valve for the gas inflow and the gas pressure in the gas-filled space is opened and closed in accordance with a desired value for the water level in the water exit chamber. A change in the height of this water level effects a change in the driving pressure gradient via the openings in the region of the container base, and simultaneously also in the volumetric flow distribution. The pressure difference active for the openings is limited in this case by the sum of the overflow height of the weir in the water entry chamber and the height of the level of the water exit chamber.

The size of the openings in the partition is determined in accordance with the desired volumetric flow distribution between the upwardly and downwardly flowing water flow, and in accordance with the desired speeds for the two water flows. They are dimensioned, in particular, such that the speed of the water flow resulting downward does not exceed the rate of rise of the smallest gas bubbles to be separated. The critical diameter of these gas bubbles in the case of a selected downwardly directed water speed of 0.01 m/s is 130 μm. As a result, with this design gas bubbles which are larger than 130 μm pass upward to the water surface.

DETAILED DESCRIPTION OF THE INVENTION

Figure 1A:
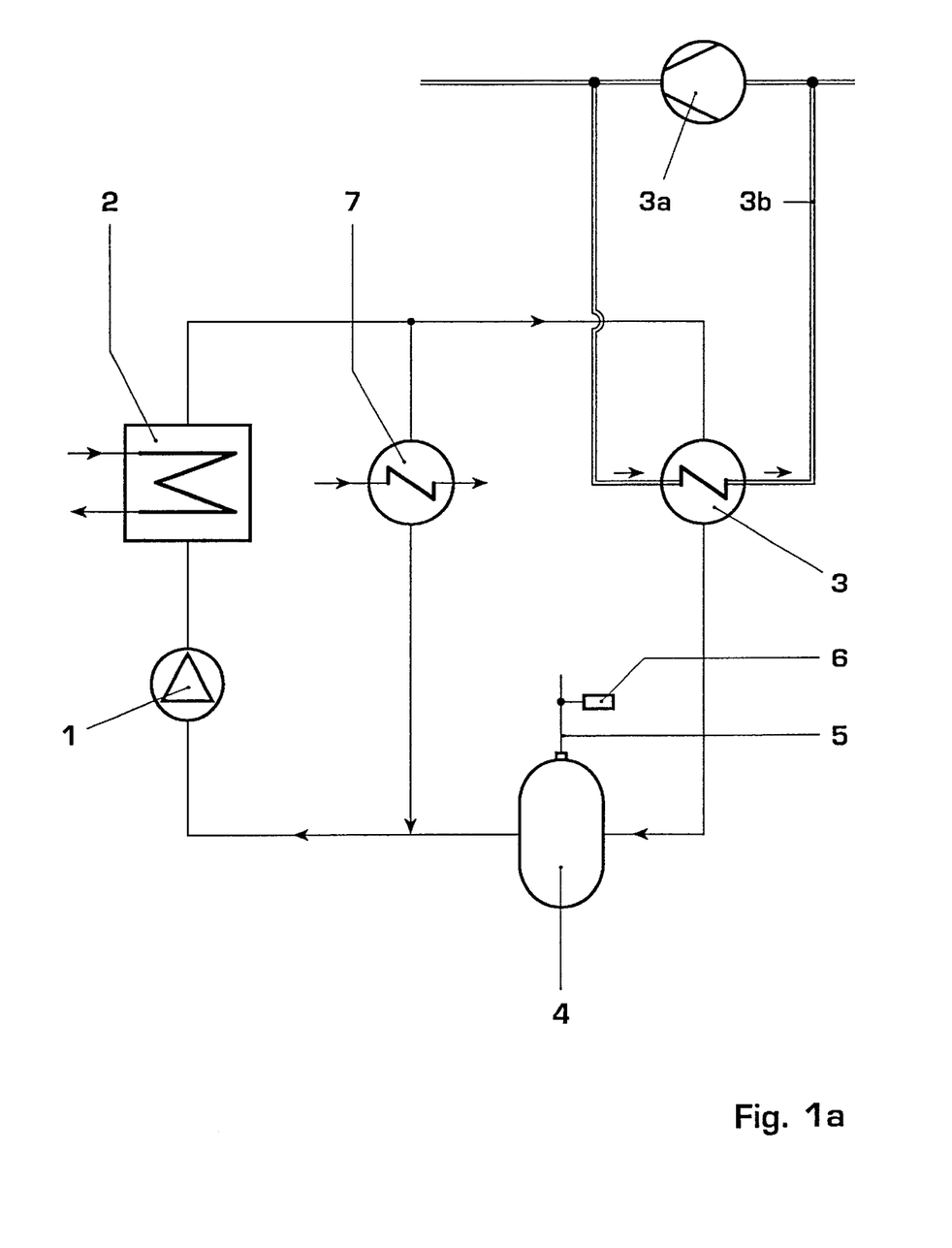
FIG. 1a shows a diagram of a water circuit with a gas/liquid separation apparatus according to the invention, and with a heat exchanger for cooling gaseous fuel for a gas turbine plant.

FIG. 1a shows a typical cooling water circuit which is used according to the prior art and in the case of the present invention for the purpose of cooling the gaseous fuel in the recirculation line of a gas compressor 3a within the fuel system of a gas turbine plant.

The cooling water is pumped through the circuit with the aid of a delivery pump 1. Downstream of the delivery pump 1, the cooling water firstly flows through a first heat exchanger, specifically a water-to-water cooler 2, in which the cooling water is cooled to a temperature required for cooling the fuel, outputting heat in the process. Said cooling water is then fed to a second heat exchanger, a natural gas heat exchanger 3. In recirculation operation, after exiting from the gas compressor 3a the gaseous fuel is guided via a line 3b to the natural gas heat exchanger 3, where the fuel is cooled, heat being output to the cooling water in the process. Here, for example, the pressure of the water is 3–5 bars, while that of the compressed combustion gas is 20–50 bars. This pressure difference can give rise to leaks of fuel into the cooling water circuit, which constitute the above-mentioned safety risks for the plant. The cooling water is therefore downstream of the natural gas heat exchanger 3 to a gas/liquid separation apparatus 4, separation apparatus for short. The latter is equipped with a gas extraction line 5, via which gases separated from the cooling water are fed to a gas detector 6. Should a gaseous fuel be detected by this gas detector, a corresponding message is issued, so that safety measures can be undertaken.

The cooling water flows to the delivery pump 1 downstream of the separation apparatus 4, thus closing the circuit. It is also possible for further apparatuses to be connected in parallel with the natural gas heat exchanger 3, such as, for example, a heat exchanger 7 for cooling hydrogen for the generator of the gas turbine plant. The invention is therefore not limited in principle to use with regard to detecting combustible gases.

Figure 1B:
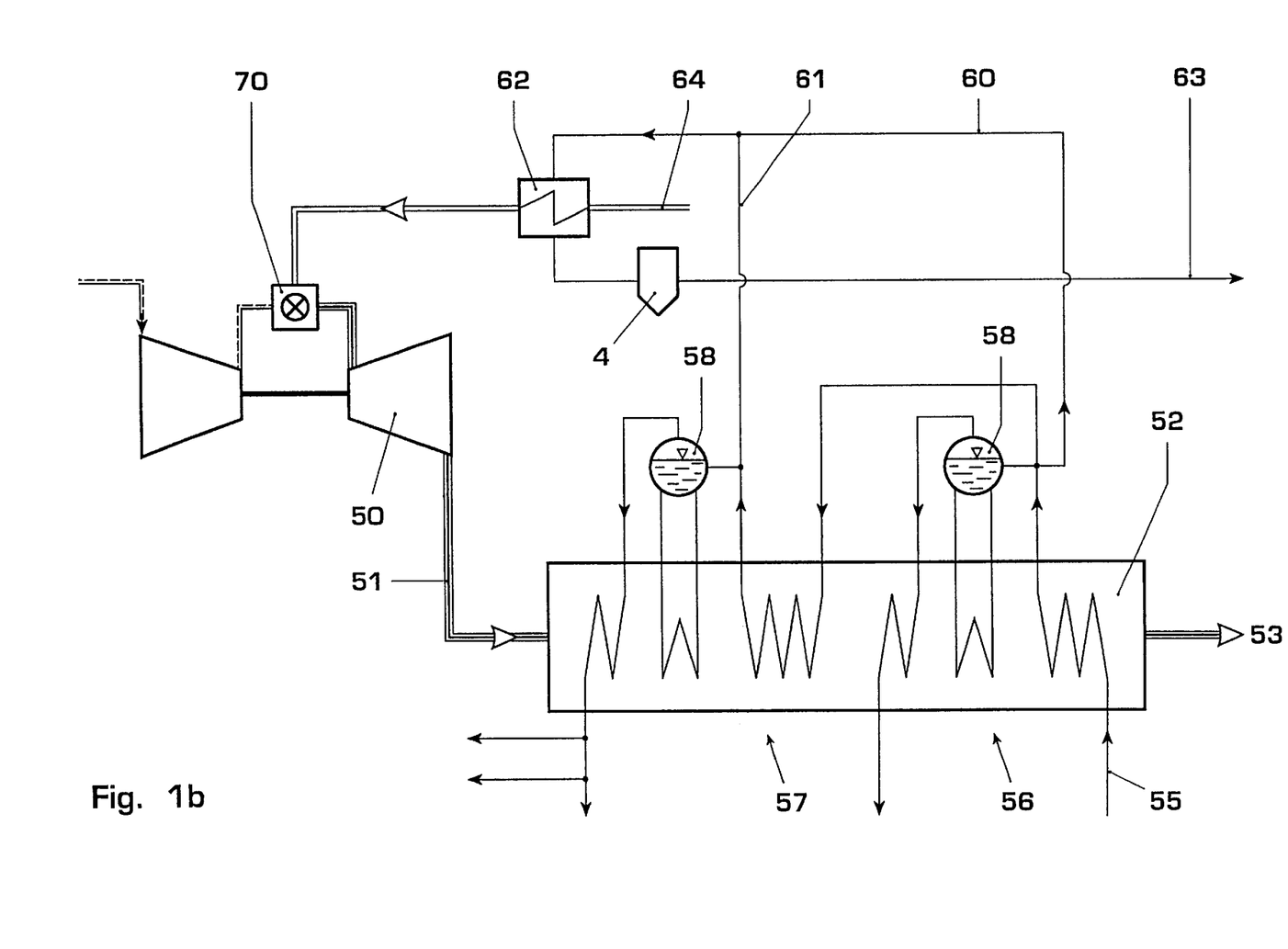
FIG. 1b shows a diagram of a water circuit with a gas/liquid separation apparatus according to the invention, and with a heat exchanger for heating gaseous fuel for a gas turbine plant.

FIG. 1b shows a gas turbine plant with a combustion chamber 70 and a gas turbine 50, the exhaust gases of which are fed to an exhaust-heat recuperator 52 via an off-gas line 51. After traversing the exhaust-heat recuperator 52, the exhaust gases pass into the atmosphere via a stack 53. A feed water line 55 guides feed water into the exhaust-heat recuperator 52 with a low-pressure region 56 and a high-pressure region 57, in which the feed water is preheated, vaporized and superheated. After the preheating in the low-pressure region, the first possibility is to branch off a portion of the water via a first line 60 for the water circuit for the purpose of heating fuel. As a further possibility, a second line 61 can branch off a portion of the water preheated in the high-pressure region, likewise for the water circuit. The lines 60 and 61 guide the warm water through the heat exchanger 62, where they pass around the tubes with the fuel. Connected downstream of the heat exchanger 62 in the water circuit is a gas/liquid separation apparatus 4 downstream of which the water finally flows back into the feed water system via a return line 63. The gaseous fuel is led into the heat exchanger 62 for the purpose of heating via the fuel line 64, downstream of which it is fed to the combustion chamber 70 of the gas turbine plant.

Figure 2A:
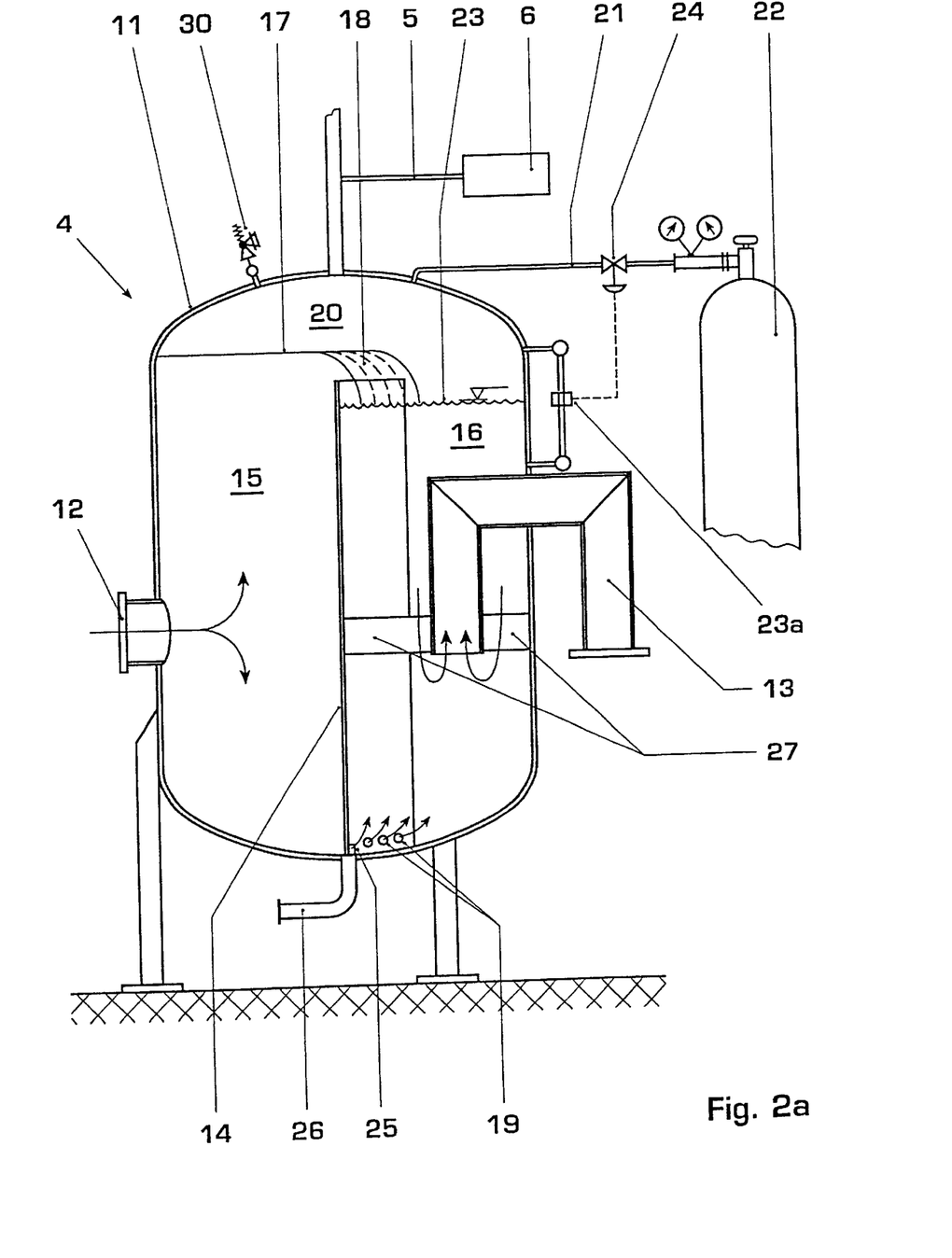
FIG. 2a shows a gas/liquid separation apparatus in accordance with the invention.
Figure 2B:
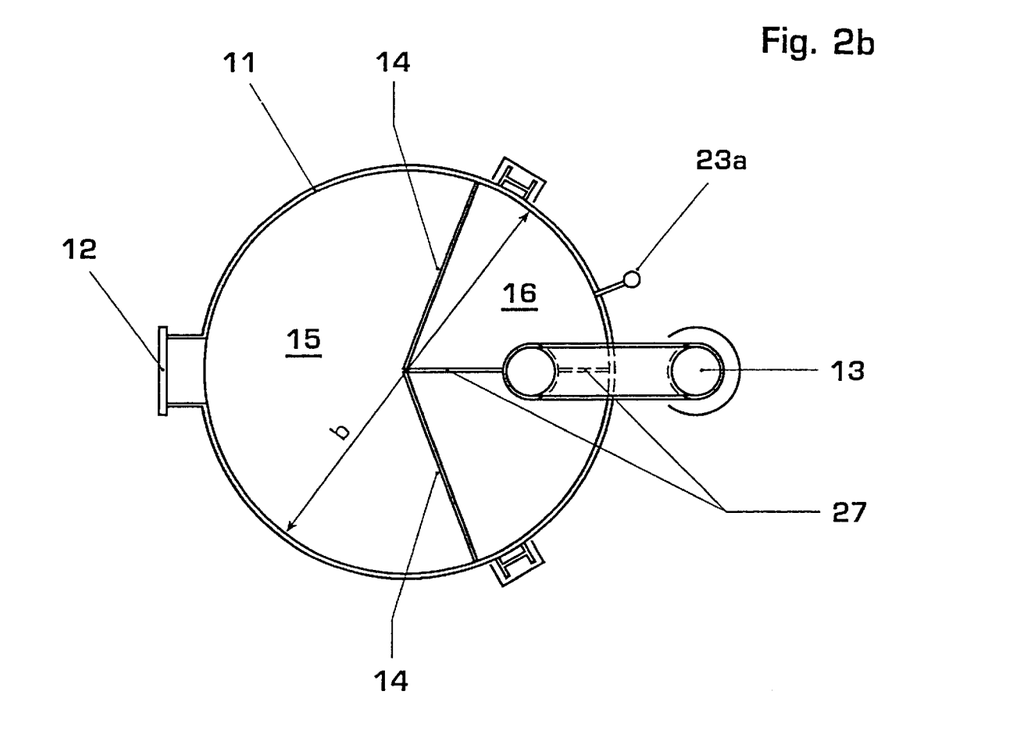
FIG. 2b shows a horizontal cross section of the separation apparatus of FIG. 2a, and FIG. 3 shows an illustration of the critical dimensions of the overflow weir of the water entry chamber relative to the water exit chamber of the separation apparatus.

FIG. 2a shows a preferred design of the gas/liquid separation apparatus 4 according to the invention, as it is applied in the cooling water circuit of FIG. 1a and in the hot water circuit of FIG. 1b. It comprises a container 11 with a water inlet 12 and water outlet 13. The interior of the container 11 is partitioned by means of a partition 14 into two chambers, a water entry chamber 15 and a water exit chamber 16. The separating wall 14 runs from the base of the container up to a prescribed height, in which case it does not reach the upper termination of the container, and so a water-free space remains between the upper edge of the separating wall 14 and the upper termination of the container 11. In this exemplary embodiment, the separating wall 14 is arranged in the container such that the volume of the water entry chamber 15 is greater than the volume of the water exit chamber 16. As shown in FIG. 2b, the separating wall 14 has a V shape, the side with the outer, greater angle of the V-shaped separating wall 14 forming the water entry chamber 15 together with the lateral surface of the container 11, and the side with the inner, smaller angle of the V-shaped separating wall 14 forming the water exit chamber 16 together with the remainder of the lateral surface of the container 11. The V shape of the partition and the arrangement thereof offer a simple possibility for splitting up the container volume into the two water chambers, as well as also of implementing a large overflow width of the overflow weir in conjunction with a given container cross section. Because of its angled shape, the separating wall 14 has an increased stiffness and can more effectively withstand water buffeting from the water inlet valve, so-called "water hammering".

The water flows through the water inlet 12 into the water entry chamber 15. The latter serves, in particular, as a calming section. A large fraction of the water flows outward here, its water level 17 being calm and smooth. From there, it flows over the edge of the separating wall 14, as over an overflow weir 18, into the water exit chamber 16. The remaining, smaller fraction of the water flows downward in the water entry chamber 15, and likewise passes into the water exit chamber 16 via a plurality of openings 19, for example simple bores or orifices which are arranged near the base of the container. From there, the water leaves the separation apparatus 4 via the water outlet 13.

The water which has flowed into the water entry chamber 15 rises, for example, upward to a fraction of 80%, while the smaller fraction of 20% flows downward. The container dimensions are selected in this case such that the rate of rise of the water does not exceed, for example, 0.1 meters per second, and the speed of the flow of water downward does not exceed 0.015 meters per second. For this purpose, in one design the container has a diameter of 1.5 meters, the partition 14 having an angle of 140° in the water exit chamber 16, and of 220° in the water entry chamber 15. This splitting up of the angle, and the arrangement of the partition inside the container has the effect that the water entry chamber 15 has a larger volume, since the gas/liquid separation also takes place there.

Gas bubbles distributed in the water entry chamber 15 are entrained in the upward flow of the water therein, said bubbles moving upward at a speed of 0.01 to 0.25 meters per second with reference to the water flow. This relative speed depends on the size of the gas bubbles. Gas bubbles with a diameter of 1 millimeter and more move upward, for example, at a rate of 0.1 meters per second and more. Smaller gas bubbles rise up more slowly. The relative rate of rise of gas bubbles in water with a diameter of approximately 0.1 millimeters is 0.015 meters per second. Consequently, in the present example gas bubbles with a diameter of approximately 0.1 millimeters and a relative speed of 0.015 meters per second can be in equilibrium with the downwardly flowing water flow, since the downwardly flowing water flow likewise has a downward speed of 0.015 meters per second. Even smaller bubbles are entrained downward with the downward flow, and pass through the openings 19 into the water exit chamber 16. Thus, the downward speed simultaneously limits the size of the gas bubbles which are entrained downward and are thereby not separated.

The gas bubbles which have risen up escape at the calm water level 17 into a water-free, gas-filled space 20.

This space 20 is filled by a gas such as, for example, nitrogen, carbon dioxide or an inert gas. This gas serves simultaneously as reference gas for the gas detector 6. A gas feed line 21 leads from a gas container 22 to the separation apparatus 4. The gas feed, and thus the gas pressure in the space 20 is controlled in accordance with the water level 23 in the water exit chamber 16. If, in accordance with a level-measuring unit 23a, the water level 23 is above a prescribed desired value, the valve 24 in the gas feed line 21 remains open, for example in response to the output of a signal by a reed relay, until the level has been forced back as a consequence of a rise in pressure to the desired value, after which the gas feed is automatically ended by closing the valve 24. The gas-filled space 20 formed above the surface 17, 23 of the water preferably comprises approximately a tenth of the total volume of the separation apparatus 4. A very small volumetric flow of the gas located in the gas-filled space 20 is continuously extracted from the container 11 via the gas-extraction line 5 and led to the gas detector 6 for the purpose of detecting gases which differ from the reference gas located in the gas container 22.

As mentioned, a smaller fraction, for example 20%, of the water flow flows downward in the water entry chamber 15 and through the openings 19 into the water exit chamber 16. Gas bubbles with a diameter of less than 0.1 millimeters are entrained in this case in the present numerical example, said gas bubbles signifying no operating risk for the delivery pump, as a rule.

The limitation of the downwardly entrained gas bubbles is a function of the design of the separation apparatus 4 and of the volumetric flow. Other designs of the separation apparatus 4 lead to another distribution and other rates of rise and fall of the water in the water entry chamber or water exit chamber, and thereby also to other sizes of gas bubbles which can be deposited and detected. In particular, the splitting up of the volumetric flows in the water entry chamber is determined by the cross-sectional surface of the openings 19 and the water level 23 in the water exit chamber 16.

The design of the separation apparatus 4 is illustrated with the aid of the following example.

A volumetric flow of 0.05 m³/s flows into the separation apparatus via the water inlet. Of this, 0.04 m³/s flow upward, and 0.01 m³/s flow downward at speeds of approximately 0.04 m/s upward and 0.01 m/s downward. Calculations by, for example, W. J. Beek and M. K. Muttzall: Transport Phenomena, pages 101/106, Wiley and Sons (1975) demonstrate that gas bubbles with a diameter of less than 0.130 millimeters are entrained downward. The dimensions of the overflow weir and of the openings can now be determined, for example, after W. Bohl: Technische Strömungslehre [Technical fluid dynamics], pages 203–232, Vogel-Handbuch (1982), 5$^{th}$ edition, the associated variables being illustrated in FIG. 3. In relation to the friction value y of the weir, the overflow width b according to the exemplary embodiment (equal to the diameter of the container 11) and the height of the overflow $h_w$, the rate of rise of the water $u_{up}$ behaves in accordance with $u_{up} \sim y \cdot b \cdot (h_w)^{3/2}$, y in turn being a function of $h_w$ and the total height s of the partition. Finally, the relationship of the cross-sectional area A of the openings to the speed $u_{down}$ of the downward flowing water is in accordance with $U_{down} = d \cdot A \cdot (constant \cdot h_T)^{1/2}$, d being the flow coefficient of the opening. The openings in the partition should be dimensioned such that the speed of the downwardly flowing water does not exceed the rate of rise of the smallest gas bubbles still to be separated. In accordance with FIG. 3, the variable $h_T$, that is to say the height of the water level in the water entry chamber above the water level in the water exit chamber, is equal to the sum of the height of the overflow $h_w$ and the height h of the partition above the water level in the water exit chamber.

Figure 3:
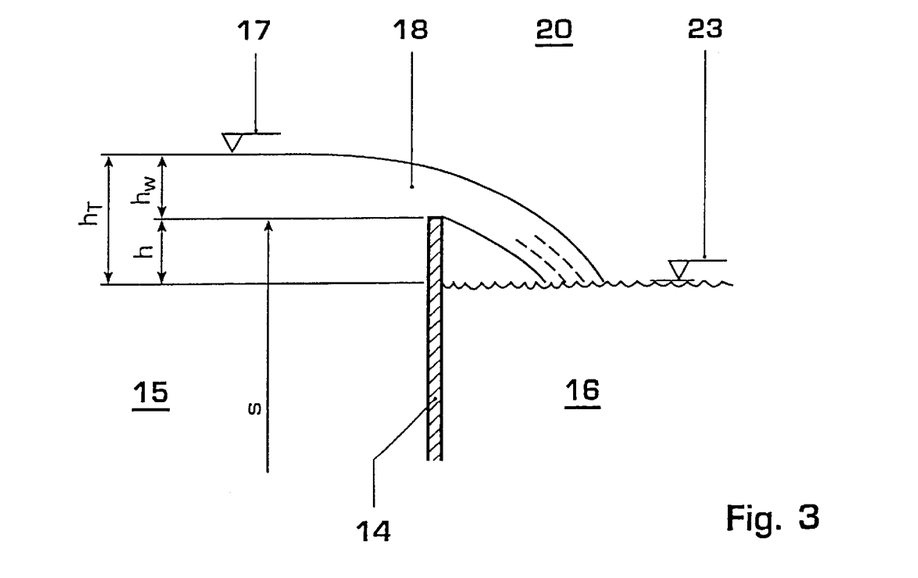

Given a container diameter or an overflow width b 1.5 meters, such a design yields an overflow height of the weir $h_w$ of 0.06 meters, a height h of 0.05 meters and a cross-sectional area of the openings of 0.013 m². It is to be noted in this case that variations in the volumetric flow of 30% barely alter these calculated parameter values.

Finally, at the base of the container is an opening 25 which opens into a drainage nozzle 26 and serves to empty the container at standstill. The water outlet 13 from the water exit chamber 16 is implemented in the form of a U tube with downwardly directed limbs of which one limb is welded in the interior of the container to the partition 14 and the inner wall of the container 11 with the aid of two fastening plates 27. The fastening plates 27 serve, on the one hand, to guide the flow into the water outlet 13 as irrotationally as possible and, on the other hand, serve the purpose of strength in the case of "water hammering".

The water exit chamber 16 is, furthermore, designed such that no swirling is produced in it in terms of fluid dynamics. For this purpose, the hydraulic diameter $d_h$ of the water exit chamber 16 is determined with the aid of the Froude's number Fr and the exit speed $u_{out}$ of the water from the chamber, $Fr = u_{out}/(g \cdot d_h)^{1/2}$ and g being the acceleration due to gravity. The variable $d_h$ is the hydraulic diameter of the water exit chamber 16, which is given by $d_h = 4 \cdot A_g/P_e$, $A_g$ being the cross-sectional area of the water exit chamber 16, and $P_e$ being the wetted circumference of the water exit chamber. An irrotational flow in the water exit chamber is achieved, in particular, when the Froude's number is Fr $\leq 0.3$.

The separation apparatus according to the invention is also applied in a water circuit with a heat exchanger which is designed as a dew-point heater, and in a system for generator cooling by means of hydrogen.

Moreover, the invention is independent of the shape, arrangement, for example horizontal or vertical arrangement, and design of the container 11.

Although this invention has been illustrated and described in accordance with certain preferred embodiments, it is recognized that the scope of this invention is to be determined by the following claims.

What is claimed is:

1. A gas/liquid separation apparatus which is arranged in a water circuit in a fuel system for a gas turbine plant, the water circuit having a heat exchanger for cooling or heating gaseous fuel by means of water, said apparatus comprising:
    a container, a water inlet, a water outlet and a gas extraction line which leads to a gas detector;
    said container of the gas/liquid separation apparatus being partitioned in its interior by a separating wall into a water entry chamber and a water exit chamber which are hydraulically interconnected at least in an upper region of the container;
    said water inlet leading into the water entry chamber and the water outlet leading from the water exit chamber;
    an upwardly directed, non-turbulent flow being provided in the water entry chamber and an irrotational flow being provided into the water outlet in the water exit chamber;
    a line for feeding gas into the container being arranged on an upper termination of said apparatus; and
    a gas-filled space being provided above the water in the container, the water thereby having a free surface.

2. The gas/liquid separation apparatus as claimed in claim 1, wherein the separating wall is tightly connected to a base of the container of the gas/liquid separation apparatus, a free space being provided between the upper edge of the separating wall and the upper termination of the container, and an overflow weir through which the water flows from the water entry chamber into the water exit chamber being arranged above the upper edge of the separating wall.

3. The gas/liquid separation apparatus as claimed in claim 1, wherein the separating wall is tightly connected to a base of the container of the gas/liquid separation apparatus, and wherein the separating wall has in its upper region at least one opening which leads from the water entry chamber to the water exit chamber.

4. The gas/liquid separation apparatus as claimed in claim 2, wherein the partition has openings in a lower region thereof, and wherein the water entry chamber includes an additional flow which is directed downward from the water inlet and leads through the openings into the water exit chamber and, from there, into the water outlet of the container.

5. The gas/liquid separation apparatus as claimed in claim 4, wherein a pressure control valve is arranged in the line for feeding the gas into the container, and a level-measuring unit is arranged in the water exit chamber in order to the water level in the water exit chamber.

6. The gas/liquid separation apparatus as claimed in claim 5, wherein toe separating wall comprises a V-shaped horizontal cross section, an inner wall of the V-shaped partition forming the water exit chamber together with an inner wall of the container, and an outer wall of the V-shaped separating wall forming the water entry chamber together with an inner wall of the container.

7. The gas/liquid separation apparatus as claimed in claim 6, wherein the separating wall has a zig zag weir line.

8. The gas/liquid separation apparatus as claimed in claim 5, wherein the separating wall is shaped in the form of a cylinder envelope.

9. The gas/liquid separation apparatus as claimed in claim 6, wherein a safety valve for protecting the container against impermissible pressure is arranged on the container of the gas/liquid separation apparatus.

10. The gas/liquid separation apparatus as claimed in claim 9, wherein the water outlet comprises a U tube including a first limb and a second limb, the first limb being arranged in the interior of the container, and the second limb being arranged outside of the container.

11. The gas/liquid separation apparatus as claimed in claim 10, wherein plates are arranged in the water exit chamber for the purpose of fastening the U tube of the water outlet on the inner wall of the container and the separating wall and for irrotationally guiding the water into the U tube.

12. A process for separating gas from water in a water circuit of a heat exchanger in a fuel system of a gas turbine plant, comprising:
    leading water through a water inlet into a container in which a volumetric flow flows upward in a water entry chamber at uniform speed, said water flowing through a hydraulic connection into a water exit chamber which is separated from the water entry chamber by a separating wall, said water flowing irrotationally in the water exit chamber into a water outlet;
    dispersing gas bubbles in water such that said gas bubbles are entrained in the water entry chamber by the rising water flow and escape from the water, at a free surface of a calming section in the water entry chamber, into a gas-filled space above the water surface;
    detecting said gas with a gas detector; and
    defining the free surface of the calming section by the gas pressure in the gas-filled space.

13. The process as claimed in claim 12, further comprising:
    controlling the water level in the water exit chamber and thus the gas pressure it a valve in the line for feeding gas; and
    keeping the water level in the water exit chamber below the hydraulic connection between the water entry chamber and the water exit chamber.

14. The process as claimed in claim 12, further comprising:
    keeping the rate of rise of the volumetric flow in the water entry chamber as low as possible by as large a volume as possible of the water entry chamber, and maintaining the Reynolds number of the flow in the water entry chamber at a bout Re>700.

15. The process as claimed in claim 12, further comprising:

king the cross flow in the calming section as slight as possible by as large as possible a hydraulic connection between the water entry chamber and the water exit chamber.

16. The process as claimed in claim 12, further comprising maintaining the Froude's number of the flow at approximately $Fr \leq 0.3$ for an irrotational flow through the water outlet from the water exit chamber.

17. The process as claimed in claim 12, further comprising:

producing a downward-flowing volumetric flow in the water entry chamber through openings in the partition between the water entry chamber and the water exit chamber in the lower region of the container; and determining the volumetric flow flowing upward in the water entry chamber and the downward-flowing volumetric flow, as well as the speeds of said flows by controlling the cross-sectional area of the openings and the water level in the water exit chamber.

* * * * *